United States Patent [19]

Mizokami et al.

[11] 4,174,896
[45] Nov. 20, 1979

[54] ADAPTER FOR ELECTRONIC FLASH UNIT

[75] Inventors: Kazunori Mizokami, Hachioji; Osamu Kawarada, Fuchu, both of Japan

[73] Assignee: Olympus Optical Co., Ltd., Tokyo, Japan

[21] Appl. No.: 896,565

[22] Filed: Apr. 14, 1978

[30] Foreign Application Priority Data

Apr. 20, 1977 [JP] Japan .............................. 52-50076[U]

[51] Int. Cl.² .......................................... G03B 15/05
[52] U.S. Cl. .................................... 354/132; 354/140; 315/151; 354/145
[58] Field of Search ................... 354/32–35, 354/60 F, 132, 137, 139–141, 145, 149; 315/151, 159, 241 P, 323; 250/214 SF; 362/7

[56] References Cited

U.S. PATENT DOCUMENTS

| 3,776,112 | 12/1973 | Wilwerding | 354/33 |
| 4,049,996 | 9/1977 | Vital et al. | 250/214 SF |

FOREIGN PATENT DOCUMENTS 2055852 5/1972 Fed. Rep. of Germany ........... 354/132

Primary Examiner—L. T. Hix
Assistant Examiner—William B. Perkey

[57] ABSTRACT

Disclosed is an adapter for electronic flash unit which is connected to a synchro contact and a light adjustment signal output contact of a still camera having an electronically-controlled shutter mechanism. The adapter converts a light adjustment signal supplied from the camera through the light adjustment signal contact thereof into a signal with a polarity and level suitable for the operation of a light adjustment control circuit in an electronic flash unit.

6 Claims, 3 Drawing Figures

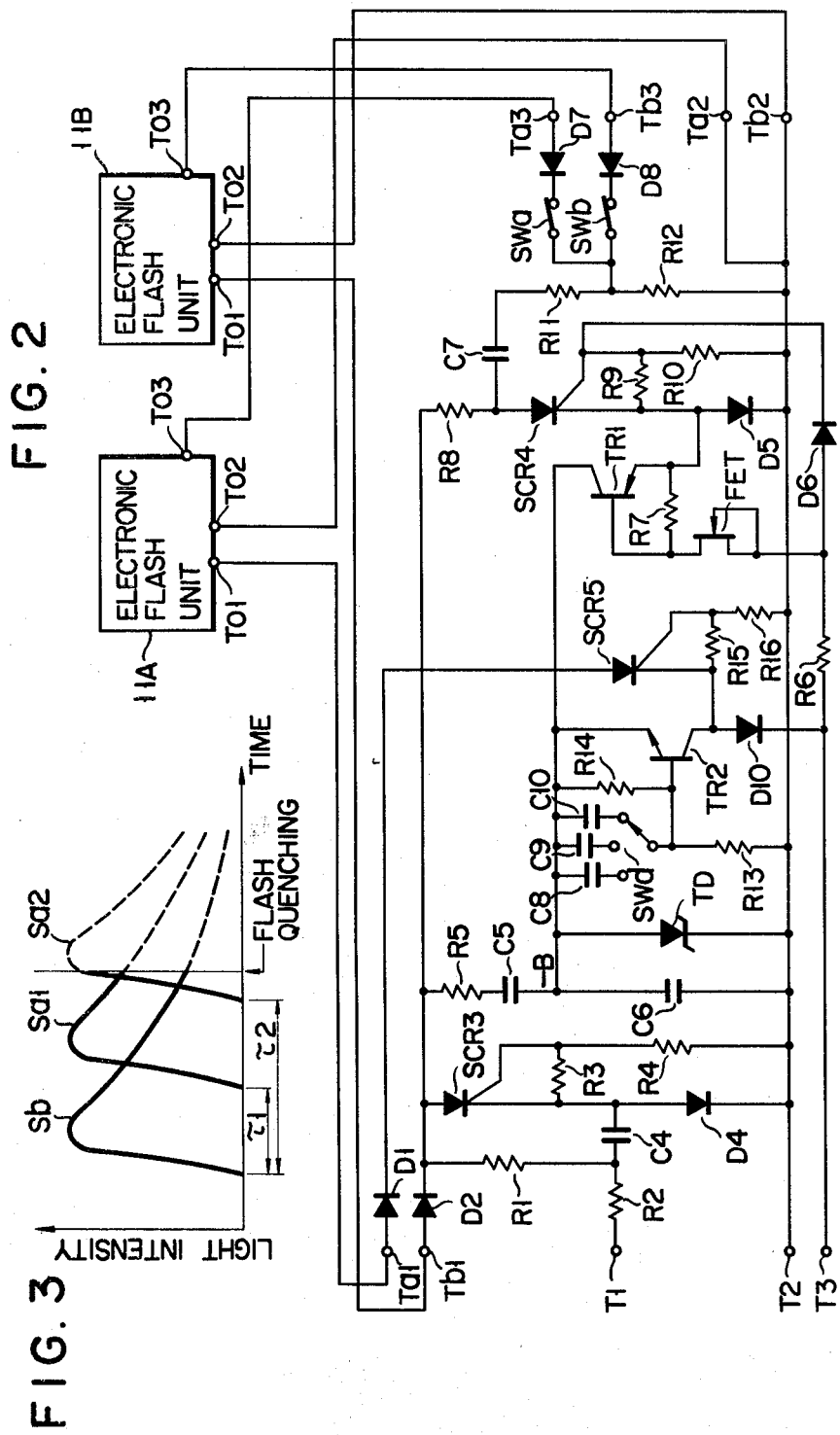

ADAPTER FOR ELECTRONIC FLASH UNIT

This invention relates to an adapter for electronic flash unit connected between a still camera having an electronically-connected shutter mechanism and producing a light adjustment signal and an electronic flash unit, and converting the light adjustment signal from the camera into a signal suitable for the operation of the electronic flash unit.

Recently, there has been developed electronic flash units which utilize a light adjustment signal produced from an auto-exposure type still camera for the control of the light emission time of the flash units. Such electronic flash units are used in combination with a still camera having an electronically-controlled shutter mechanism. This electronically-controlled shutter mechanism is so constructed that a shutter curtain may be moved in response to a photoelectric signal produced from a silicon blue cell (SBC) disposed on the floor of a mirror chamber of the camera body and a silicon blue cell disposed on either side of a lens mount. While the shutter curtain may be closed by an electromagnet for shutter closing operation, the electromagnet produces a back electromotive force when the exciting current is interrupted for closing the shutter. This back electromotive force is used as the light adjustment signal as described above. Such light adjustment signal should be able to operate a light adjustment control circuit included in the electronic flash unit, though a light adjustment signal from a camera may sometimes be different from a signal capable of operating the light adjustment control circuit of the flash unit in the polarity and/or level, depending on the type of the camera, thus preventing high-accuracy control of the light emission time of the flash unit.

An object of this invention is to provide an adapter for electronic flash unit having a converter circuit for converting a light adjustment signal produced from a still camera with an electrically-controlled shutter mechanism into a signal having characteristics suitable for the operation of a light adjustment control circuit in at least one electronic flash unit used.

According to the invention, there is provided an adapter for electronic flash unit connected between a still camera having an electronically-controlled shutter mechanism and at least one electronic flash unit, and provided with a signal converter circuit for converting a light adjustment signal produced from the camera into a signal with at least a polarity suitable for the control of the flash unit in case such light adjustment signal from the camera has a polarity opposite to such suitable one.

This invention can be more fully understood from the following detailed description when taken in conjunction with the accompanying drawings, in which:

FIG. 2 is a circuit diagram of an adapter for electronic flash unit including a circuit for lighting a plurality of electronic flash units at varied points of time, showing another embodiment of the invention; and FIG. 3 is a diagram showing the delayed light emission of a plurality of flash units.

Figure 1:
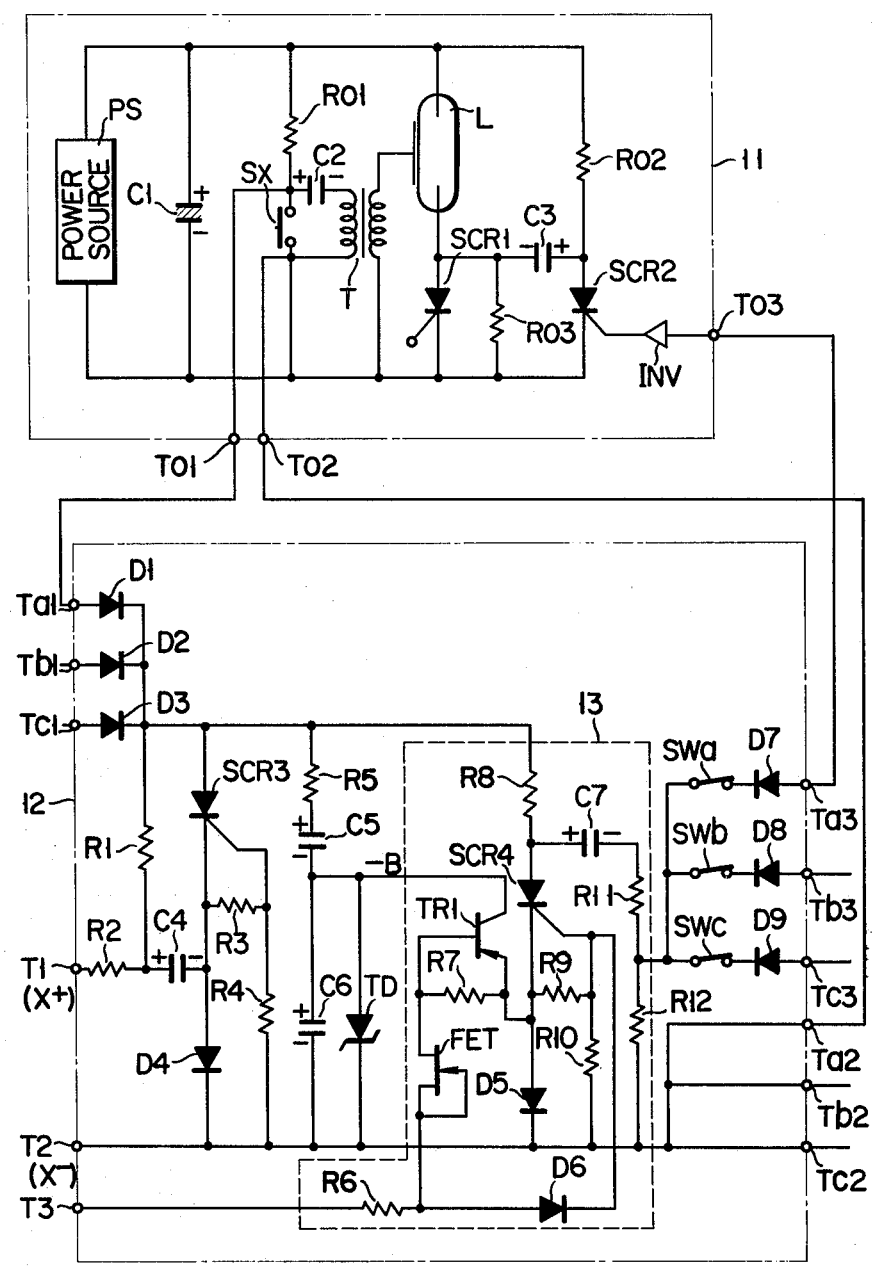
FIG. 1 is a circuit diagram of an adapter for electronic flash unit connected with an electronic flash unit, showing an embodiment of this invention.

Referring now to FIG. 1, an electronic flash unit 11 has a large-capacity capacitor C1 connected in parallel with a power source circuit PS, such as a rectifier power source circuit or battery power source circuit. The capacitor C1 is also connected in parallel with a series circuit of a discharge lamp L and a light emission control thyristor SCR1 as well as with a series circuit of a resistor Ro1 and a light emission starting switch Sx. The primary winding of a pulse transformer T is connected in parallel with a switch Sx through a capacitor C2 connected in series therewith. The secondary winding of the pulse transformer T is connected between the control electrode of the discharge lamp L and the negative electrode of the power source circuit PS. Connected in parallel with the series circuit of the discharge lamp L and thyristor SCR1 is a series circuit of a resistor Ro2 and a light adjustment control thyristor SCR2. A capacitor C3 is connected between the respective anodes of the thyristors SCR1 and SCR2, while a resistor Ro3 is connected between the anode and cathode of the thyristor SCR1.

The electronic flash unit 11 is connected to a still camera with an electronically-connected shutter mechanism (not shown) through an adapter 12. This adapter 12 has terminals Ta1, Tb1, Tc1, Ta2, Tb2, Tc2, Ta3, Tb3, Tc3, T1, T2 and T3. The terminals Ta1, Ta2 and Ta3 are connected with terminals To1, To2 and To3 of the electronic flash unit 11, respectively. The terminals Tb1, Tb2, Tb3, Tc1, Tc2 and Tc3 are connected as required with terminals of other electronic flash units (not shown).

The terminals Ta1, Tb1 and Tc1 are connected, respectively, with the anodes of diodes D1, D2 and D3, each cathode of which is connected with the anode of a thyristor SCR3 as well as with the terminal T1 through resistors R1 and R2 connected in series therewith. The cathode of the thyristor SCR3 is connected to the terminals T2 and Tc2 through a diode D4 in the forward direction. A capacitor C4 is connected between the junction of the resistors R1 and R2 and the cathode of the thyristor SCR3. A bias resistor R3 is connected between the control electrode and cathode of the thyristor SCR3, while a resistor R4 is connected between the junction of the resistor R3 and the control electrode and the terminal T2. The anode of the thyristor SCR3 is connected with the cathode of the diode D4 through a resistor R5 and capacitors C5 and C6 connected in series therewith. The junction of the capacitors C5 and C6 is connected with the anode of a Zener diode TD as well as with the collector of a PNP transistor TR1 in a signal converter circuit 13. The base of the transistor TR1 is connected with the drain of a field effect transistor FET for noise squelching as well as with the emitter of the transistor TR1 through a resistor R7. The source of the FET is connected with the gate thereof as well as with the terminal T3 through a resistor R6. The emitter of the transistor TR1 is connected with both the cathode of the thyristor SCR4 and the anode of the diode D5. The anode of the thyristor SCR4 is connected with the common junction of the cathodes of the diodes D1, D2 and D3 through a resistor R8. The cathode of the diode D5 is connected with the terminals T2 and Tc2. The control electrode of the thyristor SCR4 is connected with the cathode thereof through a resistor R9 as well as with the terminal T2 through a resistor R10. The anode of the thyristor SCR4 is connected with the terminal T2 through a capacitor C7 and resistors R11 and R12 connected in series therewith. The junction of the resistors R11 and R12 is connected with the respective cathodes of diodes D7, D8 and D9 through switches SWa, SWb and SWc, respectively. The anodes of these diodes D7, D8 and D9 are connected with the terminals Ta3, Tb3 and Tc3, respectively.

In the above circuit configuration, the adapter 12 is supplied with electric power from the power source circuit PS of the electronic flash unit 11, and the capacitors C4, C5 and C7 are so charged as to have the polarity as shown. In this state, when a shutter release button of the camera (not shown) is depressed to short the synchro contact thereof, the capacitor C4 is discharged through the resistor R2, terminal T1, synchro contact of the camera, terminal T2, resistor R4 and resistor R3 in this order. Consequently, the thyristor SCR3 is turned on. When the thyristor SCR3 is turned on, the connection between the terminals Ta1, Tb1 and Tc1 and the terminals Ta2, Tb2 and Tc2 is shorted through the thyristor SCR3 and diode D4. Then, the capacitor C2 of the flash unit 11 is discharged through the terminal To1, terminal Ta1 of the adapter 12, terminal Ta2, terminal To2 of the flash unit 11, and pulse transformer T in order. In consequence, a trigger pulse is supplied from the pulse transformer T to the control electrode of the discharge lamp L, causing the lamp L to emit light.

Also, the "on" operation of the thyristor SCR3 causes the capacitor C5 to be discharged through the thyristor SCR3, diode D4 and Zener diode TD. As a result, a negative voltage $-B$ corresponding to the Zener voltage of the Zener diode TD is applied to the collector of the transistor TR1. Subsequently, a positive or negative light adjustment signal from the camera is supplied to the terminal T3 of the adapter 12. If the light adjustment signal is positive, then it will be supplied to the control electrode of the thyristor SCR4 through the resistor R6 and diode D6 of the signal converter circuit 13, thereby turning the thyristor SCR4 on. If the light adjustment signal is negative, then it will render the field effect transistor FET on, thereby turning the PNP transistor TR1 on. Consequently, the negative voltage $-B$ is supplied to the cathode of the thyristor SCR4 by means of the collector-emitter line of the transistor TR1. Since the voltage $-B$ is lower than the potential (reference potential) of the thyristor SCR4, the thyristor SCR4 is rendered on.

When the thyristor SCR4 is turned on, the capacitor C7 is discharged through the thyristor SCR4, diode D5, resistor R12, and resistor R11. As a result, a negative pulse is produced across the resistor R12. This pulse is supplied to the terminals Ta3, Tb3 and Tc3 through the switch SWa, SWb and SWc and the diodes D7, D8 and D9, respectively. The pulse supplied to the terminal Ta3 is supplied to an inverter INV through the terminal To3 of the flash unit 11, inverted by the inverter INV, and supplied as a positive pulse to the control electrode of the thyristor SCR2, thus causing the thyristor SCR2 to be turned on. When the thyristor SCR2 is turned on, the capacitor C3 is discharged through the thyristor SCR2 and resistor Ro3. In consequence, a voltage across the resistor Ro3 is applied as an inverse bias to the thyristor SCR1, thereby turning the thyristor SCR1 off and stopping the light emission of the discharge lamp L. When the switches SWa, SWb and SWc are opened, the control signal would not be supplied to the thyristor SCR2 of the flash unit 11, allowing full light emission of the discharge lamp L of the flash unit 11.

Thus, according to the adapter for electronic flash unit of this invention, a light adjustment signal produced from the camera may be converted into a signal with a polarity and level suitable for the control of the light adjustment control circuit of the flash unit 11 or the circuit including the inverter INV and thyristor SCR2 by means of the signal converter circuit 13 in the adapter 12, independently of the original polarity and level of the signal, so that the light adjustment control of the electronic flash unit may be achieved with accuracy.

By way of example, the light adjustment control circuit of the electronic flash unit 11 as shown in FIG. 1 is so constructed as to respond to a negative input signal. If such flash unit 11 is combined with a camera to produce a positive light adjustment signal, use of the adapter of the invention will enable the positive light adjustment signal from the camera to be converted into a negative signal, thereby securing the proper light adjustment control of the flash unit. Further, the signal converter circuit 13 of the adapter 12 has a function to convert the level of the light adjustment signal, especially a signal amplifying function. Therefore, if the level of a light adjustment signal produced from a camera is too low to operate directly the electronic flash unit, for example, then the use of the adapter of the invention will allow such low-level light adjustment signal to be amplified by means of the converter circuit 13, the flash unit being operated by the amplified signal.

Referring now to FIG. 2, there will be described an adapter for electronic flash unit according to another embodiment of the invention. In FIG. 2 the same components or elements as those used in the circuits of FIG. 1 are denoted by like reference numerals.

The adapter of FIG. 2 is so constructed that a plurality of electronic flash units may be lighted and adjusted for light emission at varied points of time. In this embodiment, the anode of the Zener diode TD is connected with a plurality of fixed contacts of a switch SWd through capacitors C8, C9 and C10, respectively, while these fixed contacts of the switch SWd are connected with the terminal T2 through a resistor R13, as well as with the base of a transistor TR2. The collector of the transistor TR2 is connected to the terminal T2 through a diode D10 in the forward direction, while the emitter is connected with the anode of the Zener diode TD. Further, the base of the transistor TR2 is connected with the cathode of the Zener diode TD through a resistor R14. A thyristor SCR5 has an anode connected with the cathode of the diode D1 and a cathode connected with the collector of the transistor TR2. The control electrode of the thyristor SCR5 is connected with the cathode thereof through a resistor R15 as well as with the terminal T2 through a resistor R16.

When a camera is combined with the adapter of FIG. 2, the shutter release button of the camera is depressed, and the synchro contact is shorted, the thyristor SCR3 is turned on in the same manner as the case of the adapter of FIG. 1. As a result, a conducting circuit is formed between the terminal Tb1 and the terminals Ta2 and Tb2, and a flash unit 11B connected with the terminal Tb1 emits light in such a manner as indicated by Sb in FIG. 3. Meanwhile, the transistor TR2 is turned on after the passage of a delay time determined by the time constant of a time constant circuit of the resistor R13 and e.g. the capacitor C10. The thyristor SCR5 is turned on in response to the "on" operation of the transistor TR2. Consequently, a conducting circuit is formed between the terminal Ta1 and the terminals Ta2 and Tb2 through the thyristor SCR5 and diode D10, and another flash unit 11A connected with the terminal Ta1 and the terminal Ta2 or Tb2 emits light in such a manner as indicated by Sa1 in FIG. 3. That is, the flash unit 11A is lighted after a delay time τ1 corresponding to a time constant determined by the time constant circuit (including C10 and R13). When the switch SWd is changed over to the capacitor C9, however, the flash unit 11A is lighted after a delay time τ2 corresponding to a time constant determined by the capacitor C9 and resistor R13, as indicated by Sa2 in FIG. 3.

Stop of light emission is made in response to a light adjustment signal from the camera, as described in connection with the embodiment of FIG. 1. Also in this second embodiment, the flash units 11A and/or 11B may achieve full emission when the switches Swa and/or SWb are opened.

Although the above embodiments are particularly effective for a low-level light adjustment input signal, the adapter may, for a high-level negative signal, be so constructed that the high-level negative light adjustment signal is not supplied to the control electrode but to the cathode of the thyristor SCR4 through the resistor R6 without employing an amplifier circuit formed of the field effect transistor FET and bipolar transistor TR1. In this case, the cathode of the thyristor SCR4 is found to be a highly negative electrode, so that the thyristor SCR4 is to be caused to conduct. Furthermore, although the aforesaid signal converter circuit 13 has both the polarity-inversion and amplifying functions, it may be so constructed as to have either of these functions.

What we claim is:

1. An adapter connected between at least one electronic flash unit having a light adjustment circuit and a selected one of a plurality of still cameras of various types with means for generating respective light adjustment signals of different characteristics and each having an electronically-controlled shutter mechanism including a synchro contact and a light adjustment signal output contact through which a light adjustment signal is transferred, said adapter comprising:
   (a) a trigger circuit means for generating at least one trigger signal in response to the actuation of the synchro contact of the camera to start light emission of the electronic flash unit in response to the trigger signal;
   (b) a signal converter circuit for converting the respective light adjustment signal transferred from the selected camera into a signal having characteristics suitable for the operation of the light adjustment circuit of the electronic flash unit; and
   (c) a converted signal supplying means for supplying the signal converted by said signal converter circuit to the light adjustment circuit of the flash unit in order to stop the light emission of the flash unit.

2. An adapter for an electronic flash unit having a light adjustment circuit responsive to a light adjustment signal having a predetermined polarity and level, according to claim 1, wherein said signal converter circuit is formed of a circuit for converting the light adjustment signal supplied from the camera into a signal having said predetermined polarity and level suitable for the operation of the light adjustment circuit of said flash unit.

3. An adapter according to claim 2, wherein said signal converter circuit is formed of a circuit for amplifying a light adjustment signal from the camera to said predetermined level and converting the polarity thereof to said predetermined polarity in case said light adjustment signal has a polarity opposite to said predetermined polarity.

4. An adapter according to claim 3, wherein said signal converter circuit is formed of a field effect transistor to be turned on by a light adjustment signal with said opposite polarity, a bipolar transistor to be turned on in response to the "on" operation of said field effect transistor, and a thyristor circuit to be turned on in response to the "on" operation of said bipolar transistor and produce a signal with said predetermined polarity.

5. An adapter according to claim 1, connected to a plurality of electronic flash units, wherein said trigger circuit means generates a plurality of trigger signals at a predetermined time interval, said trigger signals being supplied to said electronic flash units, respectively, to start sequentially light emission of said flash units at the predetermined time interval.

6. An adapter according to claim 5, wherein said converted signal supplying means includes a switch for interrupting the supply of said converted signal to the light adjustment circuit of said flash unit for full light emission of said flash unit.

* * * * *